Inventor:
JÜRGEN BENNEWITZ

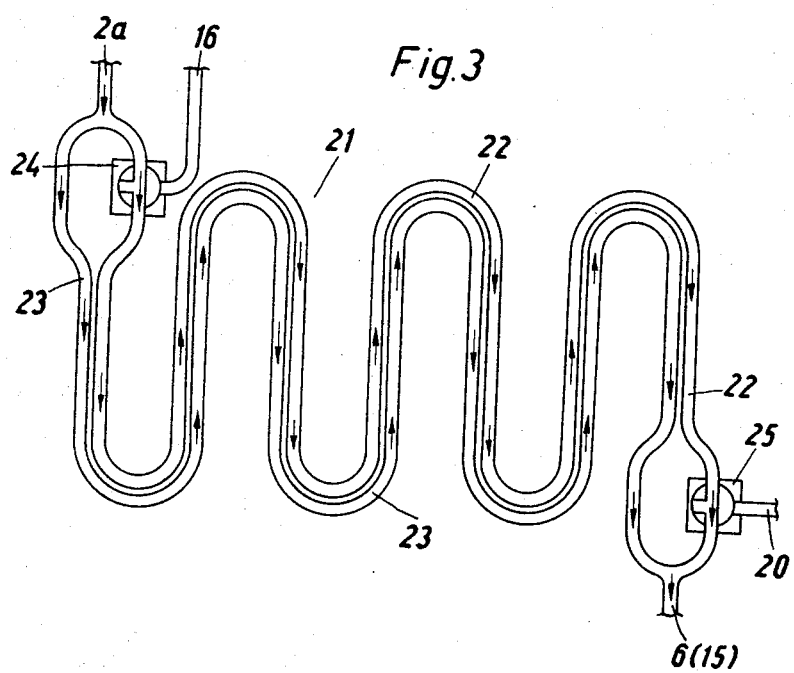
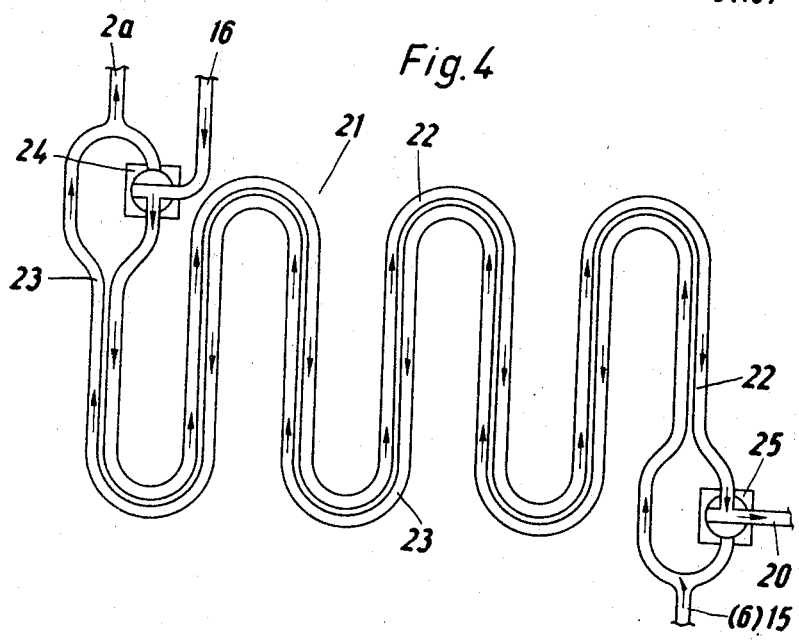

3,427,821
AIR CONDITIONER FOR COOLING AND
HEATING OF AUTOMOBILES
Jürgen Bennewitz, Heidelberg, Germany, assignor to Mecano-Bundy G.m.b.H., Heidelberg-Pfaffengrund, Germany
Filed Nov. 7, 1967, Ser. No. 681,124
Claims priority, application Germany, Dec. 21, 1966, M 72,109
U.S. Cl. 62—324
Int. Cl. F25b 13/00, 41/00

6 Claims

ABSTRACT OF THE DISCLOSURE

An automotive air conditioner for heating and cooling of the passenger space which faultlessly heats at low outside temperatures. The device consists of a compressor, a heat exchanger in the passenger compartment, another heat exchanger outside the passenger compartment, closed circuit conduit and valve means. The coolant flow is reversible for cooling or heating. The external heat exchanger has two separate coolant passages. During the cooling phase of the device, at least one of these passages is used for condensation of the coolant. During the heating period, the coolant traverses both passages, one after the other.

---

The invention relates to an air conditioner for heating and cooling of the passenger space in automobiles and consists essentially of a compressor, a heat exchanger within the passenger space, another heat exchanger outside of the passenger space, expansion means, and closed circuit connections. The coolant flow traversing the heat exchangers is reversible in accordance with the cooling or heating requirements of the passenger space.

So-called air conditioners for automobiles known heretofore primarily serve for cooling of the passenger space, or interior. In such air conditioners the coolant enters the compressor in gaseous state and is compressed therein. The compressed and superheated coolant vapor is conducted, during the cooling phase, to a heat exchanger (condenser) outside the passenger space and therein is converted to the liquid state while giving up heat. The liquefied coolant then enters an expansion valve wherein it is expanded into another heat exchanger (evaporator) which is disposed in the passenger space and connected to the compressor intake. The coolant evaporates therein, extracting the required heat of evaporation from the passenger space, thus cooling the same.

In order to employ such devices for heating also, the coolant flow traversing the heat exchanger is reversed by control means known per se, whereby the expansion valve used in the cooling phase is bypassed by means of a conduit provided with another expansion valve. Thus, in the heating phase the coolant is liquefied in the interior heat exchanger wherein it gives off heat which is imparted to the passenger space, and the exterior heat exchanger is used for the evaporation of the coolant which must acquire the heat of evaporation therein. When the air temperature is approximately zero degrees C. or less, the cycle of this process takes place at temperatures which are so low that the outer heat exchanger ices up while the inner heat exchanger cannot furnish any perceptible amount of heat. Hence, air conditioning units of this kind cannot be employed for heating of car interior at low temperatures, that is just when heating is desired.

It is the object of the invention to provide an air conditioning device which faultlessly operates to cool and to heat the interior or passenger space of automobiles even at temperatures below 0° C.

This is accomplished by forming the external heat exchanger, i.e., the heat exchanger outside the passenger compartment, of two separate coolant passages. In the cooling phase at least one of these passages is used for liquefaction (or condensation) of the coolant. In the heating phase, the coolant traverses both these passages, one after the other. The device providing expansion of the coolant is effective in the heating phase after the coolant has traversed the first passage. Thereby, the first coolant passage, disposed before the expansion means, is utilized for the condensation of the coolant, and the occurring heat of condensation is employed for heating of the coolant vapors which had been expanded in the expansion means. This arrangement simultaneously averts icing up of the external heat exchanger, i.e., the heat exchanger disposed outside of the passenger space.

The external heat exchanger is constructed of two parallel coiled tubes through which the coolant, by means of changeover or reversing valves, flows concurrently in the cooling phase and countercurrently in the heating phase.

Other features and embodiments will become apparent by the following illustrations with reference to the accompanying drawings. However, it should be understood that these are given merely by way of explanation, and not of limitation, and that it is intended to cover all variations and modifications which do not constitute a departure from the spirit and the scope of the invention as hereinafter claimed.

In the drawings, all of which are schematics,

FIG. 3 is a simplified view of an embodiment of an external heat exchanger during the cooling phase of the air conditioner, as flow diagram; and FIG. 4 is a like view as in FIG. 3, but during the heating phase.

Figure 1:
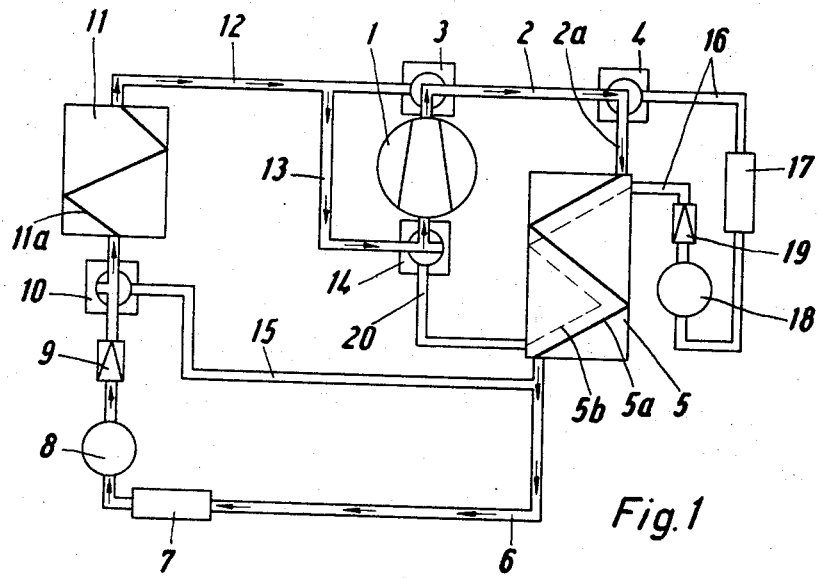
FIG. 1 is a flow diagram showing the coolant circulation during the cooling phase of the air conditioners.

Referring now to these drawings, compressor 1, which opportunely is connected to the engine of the automobile, e.g., by means of a belt, compresses the aspirated coolant, which is in vapor form, while absorbing heat. This compressor 1, in the cooling phase of the air conditioner, as indicated by the arrows in FIG. 1, conducts the superheated coolant vapor through conduits 2 and 2a, provided with reversible three-way solenoid valves 3 and 4, respectively, to external heat exchanger 5. The latter may be disposed in the air intake of the blower or fan which cools the engine. Heat exchanger 5, for instance, may consist of a meander-shaped tube 5a whose exterior carries, throughout its length, a helical rib, soldered or welded thereon.

The superheated coolant vapor is cooled in heat exchanger 5 by the air cooling means of the automobile engine and, below its saturation temperature, gradually assumes liquid state upon further cooling. The coolant thus leaves heat exchanger 5 in liquid form. It then is conducted through conduit 6, accumulator 7 and drying cartridge 8, to an expansion valve 9 of conventional construction. The latter expands the liquid coolant which had been under pressure, and the coolant enters, by way of reversible three-way solenoid valve 10, into the heat exchanger 11 inside the passenger compartment, i.e., the interior heat exchanger.

Heat exchanger 11 may also be constructed of a meander-shaped tube 11a which is provided with a helical rib throughout its length, similar to tube 5a. The expanded coolant absorbs heat within heat exchanger 11, so-called heat of evaporation, until the saturation temperature has been attained. This heat of evaporation is withdrawn from the passenger space of the car. The slightly superheated coolant vapor again is aspirated by compressor 1 from heat exchanger 11 by way of conduits 12 and 13 and a reversible three-way solenoid valve 14.

Figure 2:
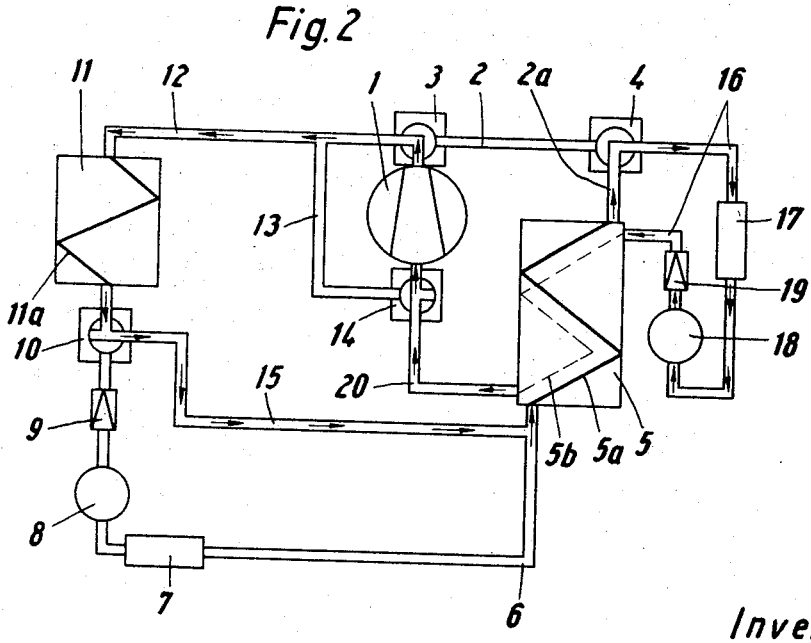
FIG. 2 is a similar flow diagram showing the coolant circulation during the heating phase.

During the heating phase of the air conditioner, as shown in FIG. 2, the solenoids 3, 4, 10 and 14 are switched over, and compressor 1 transports the compressed, superheated coolant vapor, as indicated by the arrows, through the solenoid 3 and conduit 12 into internal heat exchanger 11. Therein the superheated vapor is cooled and thus the passenger space heated.

The cooled, but entirely dry, coolant vapor now travels through the switched-over solenoid 10 and conduit 15 to the external heat exchanger 5, through whose tube 5a it flows in opposite direction when in the cooling phase. The vapor is further cooled in heat exchanger 5, and as soon as it is below the saturation temperature, condensation occurs. The heat thus gained is utilized as will be explained below. The coolant leaves the heat exchanger in completely liquid state and flows through conduit 2a, the switched-over solenoid valve 4, conduit 16, a second accumulator 17 and a drying cartridge 18 to expansion valve 19 which is of like construction as valve 9.

Expansion valve 19 permits the liquid coolant to enter external heat exchanger 5 in expanded state. For this purpose, heat exchanger 5 is provided with, e.g., another meander-shaped tube 5b, disposed in parallel to tube 5a and connected thereto for better heat transfer. The liquid coolant flows through tube 5b countercurrently relative to tube 5a and absorbs heat which had been liberated upon the condensation in tube 5a, so that a completely saturated and generally slightly superheated coolant vapor leaves heat exchanger 3 and is aspirated by compressor 1 by way of conduit 20 and the switched-over solenoid valve 14. The construction of external heat exchanger 5, having the two parallel tubes 5a and 5b, assures faultless evaporation of the coolant in the heating phase, even at very low air temperatures.

Tube 5b also can be constructed as a capillary. In that case, the expansion valve 19 in conduit 16 is not required.

The embodiments shown in FIGS. 3 and 4 illustrate an external heat exchanger 21 which also consists of two meander-shaped parallel tubes 22 and 23 provided with helical ribs (not shown). These two tubes 22 and 23 are connected at their ends by three-way solenoid valves 24 and 25. This enables, as shown in FIG. 3, a coolant flow during the cooling phase from conduit 2a through conduits 22 and 23 in like direction. The coolant then leaves through conduit 6 in liquid state. Thereby, heat exchanger 21 which must carry off both heat of condensation and heat of superheating during the cooling phase (this determines the dimensioning of this exchanger), can be considerably smaller than usual.

In the heating phase of the air conditioner, as shown in FIG. 4, both solenoids 24 and 25 are switched over. The vaporous coolant entering tube 23 of heat exchanger 21 by way of conduit 15 leaves through conduit 2a in liquid state. As mentioned above, the bulk of the heat of superheating had been carried off in the external heat exchanger 11 so that heat exchanger 21 solely removes heat of condensation. The liquid coolant then flows through conduit 16 to heat exchanger 21, this time, however, flowing through tube 22, and leaves through conduit 20 in vapor state. Hence, the coolant flows countercurrently through tubes 22 and 23 in heat exchanger 21 during the heating phase of the air conditioner.

It is, of course, feasible to arrange the tubes in the external heat exchanger so that the coolant flows therethrough concurrently during the heating phase of the air conditioner.

I claim as my invention:

1. In an automotive air conditioner capable of providing heating and cooling of the passenger compartment and having
   a compressor;
   a first heat exchanger inside said compartment;
   a second heat exchanger outside said compartment;
   expansion means and closed circuit conduit means connecting said compressor and heat exchangers;
   a coolant flowing therethrough; and
   reversing means for the coolant flow;
   the improvements which comprise
   said second heat exchanger having at least two helical tubes serving as coolant passages;
   said coolant flowing through at least one passage when providing cooling to liquefy therein;
   said coolant flowing successively through all passages when providing heating;
   said expansion means being an expansion valve and operating when providing heating after the flow of the coolant through the first passage.

2. The air conditioner as defined in claim 1, wherein said helical tubes are disposed in parallel relative to each other.

3. The air conditioner as defined in claim 1, wherein both said passages have like inner diameter.

4. The air conditioner as defined in claim 1, wherein said helical tubes are connected by reversible valves, the coolant flowing through the tubes in concurrent flow when providing cooling, and countercurrently when providing heating.

5. The air conditioner as defined in claim 1, wherein at least a portion of said second passage is a capillary.

6. The air conditioner as defined in claim 1, wherein said reversing means are a plurality of solenoid valves; two of said valves being disposed successively between said second and said first heat exchanger;
   and wherein, when providing cooling, in said conduit means between said heat exchangers, there are connected in succession, and operational:
   an accumulator;
   a drying cartridge; and
   a third solenoid valve;
   said first heat exchanger having a bypass connected to said compressor by way of a fourth solenoid valve;
   and wherein, when providing heating, in said second heat exchanger, there are connected and operational:
   a conduit leading to said first passage therein from said fourth solenoid valve;
   another conduit from said second solenoid valve to said second passage, said other conduit containing, in succession, a second accumulator;
   a second drying cartridge; and
   a second expansion valve.

References Cited

UNITED STATES PATENTS

| | | | |
|---|---|---|---|
| 3,015,939 | 1/1962 | Brainard | 62—160 |
| 3,023,592 | 3/1962 | Schordine | 62—324 |
| 3,078,689 | 2/1963 | Japhet | 62—324 |
| 3,132,492 | 5/1964 | McGrath | 62—324 |

WILLIAM J. WYE, *Primary Examiner.*

U.S. Cl. X.R.

62—513